(12) United States Patent
Merino Vazquez et al.

(10) Patent No.: US 10,686,847 B2
(45) Date of Patent: Jun. 16, 2020

(54) DYNAMIC SERVICE POINT TRIGGERING IN AN IP MULTIMEDIA SUBSYSTEM

(71) Applicant: Telefonaktiebolaget LM Ericsson (publ), Stockholm (SE)

(72) Inventors: Emiliano Merino Vazquez, Madrid (ES); Flor Belén Lorenzo Cabezas, Madrid (ES); Antonio Pescador Del Oso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 109 days.

(21) Appl. No.: 15/557,182

(22) PCT Filed: Mar. 13, 2015

(86) PCT No.: PCT/EP2015/000559
§ 371 (c)(1),
(2) Date: Sep. 11, 2017

(87) PCT Pub. No.: WO2016/146139
PCT Pub. Date: Sep. 22, 2016

(65) Prior Publication Data
US 2018/0041547 A1 Feb. 8, 2018

(51) Int. Cl.
*G06F 15/177* (2006.01)
*H04L 29/06* (2006.01)

(52) U.S. Cl.
CPC ...... *H04L 65/1016* (2013.01); *H04L 65/1046* (2013.01); *H04L 65/1069* (2013.01); *H04L 65/1073* (2013.01)

(58) Field of Classification Search
None
See application file for complete search history.

(56) References Cited

U.S. PATENT DOCUMENTS

| 7,792,528 B2 * | 9/2010 | Naqvi | H04M 7/123 370/389 |
| 2006/0140385 A1 * | 6/2006 | Haase | H04L 29/06 379/221.09 |

(Continued)

FOREIGN PATENT DOCUMENTS

WO 2009001177 A1 12/2008

OTHER PUBLICATIONS

3GPP, "3rd Generation Partnership Project; Technical Specification Group Core Network and Terminals; IP Multimedia (IM) session handling; IM call model; Stage 2 (Release 12)", 3GPP TS 23.218 V12.3.0, Sep. 2013, 1-73.

(Continued)

*Primary Examiner* — Phuoc H Nguyen
(74) *Attorney, Agent, or Firm* — Murphy, Bilak & Homiller, PLLC

(57) ABSTRACT

The present invention relates to a first and second method and corresponding nodes for generating dynamic Service Point Triggers, SPTs, in an IP multimedia subsystem, IMS. The first method comprises receiving, at a first node, Initial Filter Criteria, IFC, belonging to a service profile of a user subscribed to said IMS, said IFC including a plurality of preset SPTs, respectively indicating conditions to be evaluated and information including at least one criterion for generating one or more dynamic SPTs; evaluating, at said first node, said plurality of preset SPTs according to a configured order of priorities; generating, at said first node, if said at least one criterion is met, one or more dynamic SPTs based on said information, whereby said dynamic SPTs indicate respective new conditions to be evaluated. The second method comprises configuring, at a second node, the above IFC, and providing the configured IFC to the above first node during initial registration of the user.

26 Claims, 14 Drawing Sheets

(56) References Cited

U.S. PATENT DOCUMENTS

| | | | | |
|---|---|---|---|---|
| 2006/0291487 A1* | 12/2006 | Naqvi | ............... | H04L 12/2801 |
| | | | | 370/401 |
| 2007/0067470 A1* | 3/2007 | Ayers | .................... | H04L 67/16 |
| | | | | 709/230 |
| 2008/0137646 A1* | 6/2008 | Agarwal | ............... | H04W 4/02 |
| | | | | 370/352 |
| 2009/0122794 A1* | 5/2009 | Wu | ....................... | H04W 8/20 |
| | | | | 370/352 |
| 2009/0262920 A1 | 10/2009 | Henrikson et al. | | |
| 2010/0049794 A1* | 2/2010 | Shi | .................... | H04L 65/1073 |
| | | | | 709/203 |
| 2010/0183007 A1* | 7/2010 | Zhao | ................. | H04L 65/1016 |
| | | | | 370/389 |

OTHER PUBLICATIONS

3GPP, "3rd Generation Partnership Project; Technical Specification Group Core Network and Terminals; IP Multimedia (IM) Subsystem Cx and Dx interfaces; Signalling flows and message contents (Release 12)", 3GPP TS 29.228 V12.4.0, Dec. 2014, 1-75.

3GPP, "3rd Generation Partnership Project; Technical Specification Group Services and System Aspects; IP Multimedia Subsystem (IMS); Stage 2 (Release 13)", 3GPP TS 23.228 V13.1.0, Dec. 2014, 1-311.

* cited by examiner

| tSePoTri | ConditionNegated | | tBool | (0 to 1) |
|---|---|---|---|---|
| | SPT | | | (1 to n) |
| | Group | | tGroupID | 1 |
| | Choice of | RequestURI | tString | 1 |
| | | Method | tString | 1 |
| | | SIPHeader | tHeader | 1 |
| | | SessionCase | tDirectionofRequest | 1 |
| | | SessionDescription | tSessionDescription | 1 |
| | | DynamicSPT | tDynamicSPT | 1 |
| tDynamicSPT | SPT | Action | tDynamicSPTAction | 1 |
| | | Name | tDynamicSPTName | 1 |
| | | Value | tDynamicSPTValue | (0 to 1) *(See Note 1)* |
| tDynamicSPTAction | DynamicSPTAction | enumerated | Possible values:<br>0 (CREATE_OR_SET_DYNAMIC_SPT)<br>1 (EVALUATE_DYNAMIC_SPT)<br>2 (DELETE_DYNAMIC_SPT) *(See Note 2)* | |
| tDynamicSPTName | DynamicSPTName | string | | |
| tDynamicSPTValue | DynamicSPTValue | string | *(See Note 3)* | |

Note 1: The value shall not be included when DynamicSPTAction takes the value DELETE_DYNAMIC_SPT Note 2: DELETE_DYNAMIC_SPT shall set DynamicSPTValue to "Null".

Note 3: String "Null" is restricted.

*Fig. 8*

```xml
<xs:element name="tDynamicSPT" type="tDynamicSPT" minOccurs="0" maxOccurs="1"/>

<xs:complexType name="tDynamicSPT">
    <xs:sequence>
        <xs:element name="Action" type="tDynamicSPTAction"/>
        <xs:element name="Name" type="tString"/>
        <xs:element name="Value" type="tString" minOccurs="0"/>
    </xs:sequence>
</xs:complexType>

<xs:simpleType name="tDynamicSPTAction" final="list restriction">
    <xs:restriction base="xs:unsignedByte">
        <xs:minInclusive value="0"/>
        <xs:maxInclusive value="2"/>
        <xs:enumeration value="0">
            <xs:annotation>
                <xs:documentation>
                    <label xml:lang="en"> CREATE OR SET DYNAMIC SPT </label>
                    <definition xml:lang="en"> This value creates a dynamic SPT with its name and value </definition>
                </xs:documentation>
            </xs:annotation>
        </xs:enumeration>
        <xs:enumeration value="1">
            <xs:annotation>
                <xs:documentation>
                    <label xml:lang="en"> EVALUATE DYNAMIC SPT </label>
                    <definition xml:lang="en"> This value uses a dynamic SPT to perform filter criteria with its name and value </definition>
                </xs:documentation>
            </xs:annotation>
        </xs:enumeration>
        <xs:enumeration value="2">
            <xs:annotation>
                <xs:documentation>
                    <label xml:lang="en"> DELETE DYNAMIC SPT </label>
                    <definition xml:lang="en"> This value deletes a dynamic SPT with its name and value </definition>
                </xs:documentation>
            </xs:annotation>
        </xs:enumeration>
    </xs:restriction>
</xs:simpleType>
```

Fig. 9

```
<InitialFilterCriteria>
        <Priority>4</Priority>
        <TriggerPoint>
                <ConditionTypeCNF>0</ConditionTypeCNF>
                <SPT>
                        <ConditionNegated>0</ConditionNegated>
                        <Group>0</Group>
                        <Method>INVITE</Method>
                </SPT>
                <SPT>
                        <ConditionNegated>0</ConditionNegated>
                        <Group>0</Group>
                        <SessionCase>5</SessionCase>  # 5 = ORIGINATING_CDIV
(CALL_FORWARDING) #
                </SPT>
                <SPT>
                        <ConditionNegated>0</ConditionNegated>
                        <Group>0</Group>
                        <SIPHeader>
                                <Header>Contact</Header>
                                <Content>"AS_3"</Content>
                        </SIPHeader>
                </SPT>
                <SPT>
                        <ConditionNegated>0</ConditionNegated>
                        <Group>0</Group>
                        <DynamicSPT>
                                <Action>0</ Action >    # CREATE_AND_SET_DYNAMIC_SPT #
                                <Name>"CDIV"</Name>
                                <Value>"AS_3"</Value>
                        </SIPHeader>
                </SPT>
        </TriggerPoint>
        <ApplicationServer>
                <ServerName>sip:AS_1@homedomain.com</ServerName>
```

```
<InitialFilterCriteria>
        <Priority>5</Priority>
        <TriggerPoint>
                <ConditionTypeCNF>0</ConditionTypeCNF>
                <SPT>
                        <ConditionNegated>0</ConditionNegated>
                        <Group>0</Group>
                        <DynamicSPT>
                                <Action>1</ Action >    # EVALUATE_DYNAMIC_SPT #
                                <Name>"CDIV"</Name>
                                <Value>"AS_3"</Value>
                        </SIPHeader>
                </SPT>
        </TriggerPoint>
        <ApplicationServer>
                <ServerName>sip:AS_2@homedomain.com</ServerName>
                <DefaultHandling>0</DefaultHandling>
        </ApplicationServer>
</InitialFilterCriteria>
```

Fig. 10

| Capability | Mandatory or Optional (NOTE 1) | Description |
|---|---|---|
| Support of "Dynamic SPTs" | M | This capability indicates that the assigned S-CSCF shall be able to process IFCs which include dynamic SPT element as received from the HSS in the user profile. |

Fig. 11

DYNAMIC SERVICE POINT TRIGGERING IN AN IP MULTIMEDIA SUBSYSTEM

TECHNICAL FIELD

The present invention relates to method(s) and node(s) for generating dynamic Service Point Triggers (SPTs) in an IP multimedia subsystem (IMS), as well as to a corresponding system and computer program(s).

BACKGROUND

Service Point Triggers (SPT) are specified in the so called Initial Filter Criteria (IFC) of an IP Multimedia Subsystem (IMS) user which, in turn, belong to the service profile of a user subscribed to the IMS. The IFC is an XML-based IMS standard that may be used to define the order in which a session or a call or the like is routed across application servers. Such a routing may be conditional. This means that the session is routed to a specific application only when the session meets the criteria specified for that application. For example, it may be specified that the session is routed to a Virtual Private Network application server only when the session's Called Party Number begins with the asterisk (*).

A SPT comprises the conditions that the session or call must meet in order to, for example, the signaling of said session or call to be routed to a specific application server. Further, conditional statements using Boolean AND and OR conditions may be used between SPTs. For example, it may be specified that the session is routed to an application server, i.e. the application server is fired, if the following condition is met: (SPT1 OR SPT2) AND (SPT3 OR SPT4).

In short, there can be one or more SPTs with respect to a user. Conventionally, the SPTs contain conditions as to how an originating or terminating service or call, or even a registration, is to be dealt or handled. For example, a SPT may contain a condition as to how to further process, e.g. how to further route, a terminating Session Initiation Protocol (SIP) session addressed to the user, or a SIP call originated by the user.

If more than one group of SPTs exists for a user, they are evaluated according to a configured or pre-defined order of priorities. For example, a terminating SIP INVITE message may be first routed to a first Application Server AS1 according to a first trigger having the highest priority, and then to a second Application Server AS2 according to a second trigger having the second highest priority.

Internet Protocol (IP) Multimedia Systems (IMS) is a standardized technology which allows to perform, for example, Voice over IP calls (VoIP), by means of a core network layer and an application layer. The core network layer is composed of essentially three different functional entities (see 3GPP TS 23.228, chapter 4.6), a Proxy Call Session Control Function (P-CSCF), an Interrogating Call Session Control Function (I-CSCF), and a Serving Call Session Control Function (S-CSCF).

The Proxy Call Session Control Function (P-CSCF) is the point of entry to the IMS network from a user equipment (UE).

In other words, the P-CSCF is the first contact point within the IP multimedia core network (IM CN) subsystem. Its address is discovered by UEs using, for example, a mechanism as described in the section "Procedures related to Local CSCF Discovery" of 3GPP TS 23.228. The P-CSCF behaves like a Proxy, as defined in IETF RFC 3261 SIP: "Session Initiation Protocol" or subsequent versions, i.e. it accepts requests and services them internally or forwards them on. The P-CSCF shall not modify a Request URI in the SIP INVITE message. The P-CSCF may behave as a user agent as defined in the IETF RFC 3261 "Session Initiation Protocol", i.e. in abnormal conditions it may terminate and independently generate Session Initiation Protocol (SIP) transactions.

The Interrogating Call Session Control Function (I-CSCF) is the point of entry from other operator networks. In other words, the I-CSCF is the contact point within an operator's network for all connections destined to a user of that network operator, or a roaming user currently located within that network operator's service area.

Furthermore, the Serving Call Session Control Function (S-CSCF) is in charge of handling multimedia sessions and triggering the appropriate Application Servers (AS) to handle the services.

In other words, the S-CSCF performs the session control services for the UE. It maintains a session state as needed by the network operator for support of the services.

In turn, the application layer may be composed of one or several Application Servers (AS) which are in charge of executing the different supplementary services and other customized/proprietary operator services (e.g. virtual private network (VPN), pre-paid, or the like).

For example, an AS may be a Session Initiation Protocol (SIP) Application Server which may host and execute services. The SIP Application Server may further influence and impact the SIP session on behalf of the services.

Executing the different supplementary services may be achieved by interacting with the IP multimedia core network (IM CN) layer via the ISC interface between the S-CSCF and the AS, as described in 3GPP TS 23.218 (chapter 5.1.1). Furthermore, the AS may behave as SIP application servers on the ISC interface.

In 3GPP TS 23.218, cases are considered where the S-CSCF, upon receiving a user profile during an initial registration of the user in the IMS network, builds an ordered list of Initial Filter Criteria (IFC) to know which ASs are to be involved in handling an multimedia session and under which conditions, i.e. which services are to be checked/executed in association to the user when initiating or terminating requests. In addition, a configured order of priorities may be defined according to which the respective conditions are executed.

As further described in 3GPP TS 23.218 (section 5.2.3), the IFCs may be stored in the Home Subscribe Server (HSS) as part of the user profile and are downloaded to the S-CSCF upon user registration. They represent a provisioned subscription of a user to an application. In particular, the S-CSCF may request from the HSS the relevant set of IFCs that applies to the served (i.e., registered, unregistered, or both) user. On the other hand, if the S-CSCF has already a list of IFCs that is deemed valid, e.g., from a previous request, the S-CSCF may not request a new list of IFCs. In the case that multiple Filter Criteria are sent from the HSS to the S-CSCF, the S-CSCF may check the filter criteria one by one according to their indicated priority when the S-CSCF receives a message via the Mw or ISC interface.

The IFC may therefore contain information about a corresponding triggering that should be performed toward the different AS. Accordingly, an IFC may contain a group of SPTs which indicate conditions to be evaluated and an order to be followed when evaluating these conditions (priority of triggers). In other words, SPTs may be points in the SIP signaling on which Filter Criteria can be set. The IFC may also have a priority and an associated AS. In particular, this priority may be used to build an ordered list of IFCs, for example, to indicate in which order respective ASs are accessed or triggered.

If a condition (or set of conditions) is met, e.g. a SIP INVITE message originated from the user and containing a multimedia telephony indication (SPTs in this case are: (1) SIP method=INVITE, (2) direction of request=originating and (3) feature tag=Multimedia Telephony), then the IFC also indicates the AS to be involved in the IMS session, e.g. a Multimedia Telephony AS, as shown in Annex B.2.2 and B.2.3 in 3GPP TS 29.228 for example.

Therefore, current 3GPP scenarios with respect to IMS session handling indicate that conditions, i.e. the Service Point Triggers (SPTs), are evaluated based solely on the information received in the SIP request received, as described in 3GPP TS.23.218 (see figure and detailed steps in Annex C thereof).

For example, when two application servers AS1 and AS2 are assigned to provide additional services to a subscriber in a first step, a user initiates a SIP session by sending a SIP initial request to its S-CSCF.

Then, on receiving this SIP initial request, the S-CSCF evaluates the SPTs and checks if they match first initial filter criteria for a first application server (AS1). If they match, the S-CSCF forwards this request to AS1, i.e. triggers AS1.

Then, the AS1 performs any needed service logic based on the Service Key and sends the SIP request possibly with service related modification back to the S-CSCF.

On receiving the request from the AS, the S-CSCF evaluates the SPTs and checks if they match second initial filter criteria for AS2. If they match the S-CSCF forwards the request to the associated Application Server AS2, i.e. triggers AS2.

On the other hand, if the request doesn't match any further filter criteria, the S-CSCF forwards this request to the next hop based on the route decision.

The AS2 then performs any needed service logic based on the Service Key and sends the SIP request possibly with service related modification back to the S-CSCF.

If the S-CSCF checks the request sent by AS2 and finds that no initial criteria is matched, then the S-CSCF forwards this request to next hop based on the route decision.

PROBLEMS WITH EXISTING SOLUTIONS

However, problems occur when there are multiple SPTs related to a user, and the execution of which may thus be sequentially chained or sequentially performed. In this case, there is no mechanism in the prior art to distinguish which services happened or have been accessed before the request (for example, the SIP initial request), which information was included on the previous requests, or who (for example, which AS) executed the services. This situation may lead to a miss-processing of, for example originating and/or terminating, services.

The above problem with respect to the prior-art solutions may be summarized as follows:

For some upcoming deployments/technologies such as Voice over LTE (VoLTE), the network operators require a specific order when triggering legacy services (e.g. VPN, Pre-paid, or the like) in addition to the new Multimedia Telephony Services (MMTEL), where the services are associated with respective ASs, and the order my depend on the direction of the service request (originating or terminating) and the initiator of the service request.

The criteria to trigger these ASs, for example to forward a service request to these ASs to handle services is always based on the current SIP request received by the S-CSCF, and each trigger priority is evaluated independently of other trigger priorities.

That is, if a trigger priority 1 fired/triggered AS1 because the conditions/SPTs checked against the ongoing SIP request were matched, then S-CSCF will send the SIP request to AS1, which will execute the services and will send back the SIP request. However, the SIP request will be a brand new SIP request and some SIP headers will have been modified by the AS1 causing that some of the information (SIP headers) initially included in the original SIP request sent to AS1 may be lost or modified. If this original information would be required by the conditions (SPTs) configured in the next trigger priority 2 to be evaluated, such SPTs are not valid anymore and cannot be trusted. Hence the operator needs to use the SIP headers included in the new request to potentially change conditions, since the trigger priority is evaluated in an isolated/independent way without being aware about the previous actions, performed for example by the AS1.

This has been proven to work so far with current 3GPP service triggering, when there were no different legacy services to co-exist with traditional supplementary services, but with the arrival of Voice over LTE operators have the need to perform AS chaining. In such a situation several ASs hosting legacy services may be involved, e.g. in an order AS1 followed by AS2 followed by AS3, both in originating and terminating calls, and the mechanism is being challenged when some chained ASs may perform similar services, e.g. call forwarding.

For this reason, the network operator faces difficulties when AS chaining is required, i.e. several ASs are involved in a call/session/application in a particular order or trigger priority, since it becomes really hard to know, for the S-CSCF, what happened before the current SIP request.

In the following, the above technical problem is further illustrated with a specific example being related to a situation that involves 3 applications servers AS1, AS2, and AS3. Here, the specific configuration and message flow being related to a call forwarding scenario is depicted in FIG. 1.

FIG. 1 shows a flow diagram of a call forwarding problem in the prior art. As shown in FIG. 1, the flow diagram involves the originating network 10, the S-CSCF 200, a first AS 300 (AS1) being related to a VPN service, a second AS 400 (AS2) being related to a prepaid service (PREPAID), and a third AS 500 (AS1) being related to a multimedia telephony (MMTEL) service. More specifically, this specific example involves a situation according to which, when AS3 500 changes the destination of the request, e.g. call forwarding from a user B towards a user C 600, the originating services for the forwarding user (user B) should be executed. On the contrary, if any other AS changes the destination (retargeting), they want to immediately route the call towards the new destination, e.g. no more AS triggering must be performed. In summary, when configuring the conditions/SPTs, it has to be known which AS performed the retargeting.

More specifically, in step 1 of FIG. 1 a terminating call towards User B is received from the originating network 10 at the S-CSCF 200 in the form of a SIP INVITE message related to user B. Here, the SIP INVITE message may further include an SIP Call identification (SIP Call-Id) and other information.

In step 2 of FIG. 1 the S-CSCF 200 starts to evaluate the IFC from the beginning (of the priority order) for User B for the session case "terminating". That is, the S-CSCF 200 checks IFC for the session case="terminating".

According to step 3 of FIG. 1 the operator has performed a configuration that the first priority to be evaluated (priority 1) will not contain any condition, i.e. a SPT, other than the session case, which is "terminating" in the present situation. Accordingly, all SIP INVITE messages terminated at User B will trigger the first AS1 300. In other words, if the SIP INVITE message at priority 1 relates to the session case "terminating", then AS1 300 is fired.

Accordingly, in step 4 of FIG. 1 the S-CSCF 300 sends the above request (the SIP INVITE message in step 1) to AS1 300 so that VPN services may be executed.

Then, in step 5 of FIG. 1 AS1 300 creates a new SIP request based on the request received. Since the AS1 300 is a Back-to-Back User Agent (B2BUA), as described in 3GPP TS 23.218, it changes the origin of the request. More specifically, in the present example, the SIP Call-ID is changed from "A" to "B" and the origin of the request is changed from "Originating Network" to "AS_1" being related to AS1 300. It is noted here that the term "From" in, e.g., "From =AS_1" refers to the "contact" header in the SIP message, as known to the skilled person.

Next, according to step 6 of FIG. 1 the operator has performed a configured according to which the next priority to be evaluated (priority 2) will not contain any condition (SPT) other than the session case, that is, all SIP INVITE messages terminated at User B will trigger AS2 400 in second place. In other words, if the INVITE message refers to the session case "terminating", then AS2 400 is fired next.

Accordingly, in step 7 of FIG. 1 S-CSCF 200 sends the request (the SIP INVITE message according to step 5) to AS2 400 so that Pre-paid services are executed.

Then, in step 8 of FIG. 1 AS2 400 creates a new SIP request based on the request received. Since also AS2 400 is a B2BUA, it changes the origin of the request (called "From=AS_2" in the flow). More specifically, in the present example, the SIP Call-ID is changed from "B" to "C" and the origin of the request is changed from "AS_1" to "AS_2" being related to AS2 400.

According to step 9 of FIG. 1 the operator has performed a configuration according to which the next priority to be evaluated (priority 3) will again not contain any condition (SPT) other than the session case, that is, all INVITEs terminated at User B will trigger AS3 500 in third place.

Accordingly, in step 10 of FIG. 1 the S-CSCF 200 sends the above request (according to step 8) to AS3 500 so that MMTEL services are executed. Accordingly, there is an active call forwarding from User B towards User C.

In step 11 of FIG. 1 the AS3 500 creates a new SIP request based on the request received. Since also the AS3 500 is a B2BUA, it changes the origin of the request (called "From=AS_3" in the flow) and also the destination which is now User C in the SIP INVITE message.

Upon detection of the destination change, the S-CSCF 200 stops in step 12 of FIG. 1 the current triggering and restarts evaluating the IFC from the first priority again, now for the forwarding user B, as described in 3GPP TS 23.218. Here, the session case to be matched by S-CSCF 200 against configured session case SPT is "originating after call forwarding or diversion" ("orig_cdiv").

According to step 13 of FIG. 1 the operator has performed a configuration according to which the first priority to be evaluated for this session case (priority 4, since priorities 1-3 are not matched due to the configured session case "terminating" which differs from current session case being evaluate "originating after call forwarding or diversion" "orig_cdiv") will contain conditions (SPTs) indicating that only when session case="orig_cdiv" AND when the origin of the SIP request is AS3 500, then AS1 300 is to be triggered, that is, only when the MMTEL AS3 500 is the AS that executes call forwarding, originating services for the forwarding user B are to be executed.

Here, it is also noted that the SPT based on the "From" information avoids that the trigger priority 4 is fired when AS1 300 or AS2 400 change the destination.

Accordingly, in step 14 of FIG. 1 the S-CSCF 200 sends the request to AS1 300 so that VPN services are executed for user B. It is noted that the call handled now is from the forwarding user B towards the forwarded-to user C, so the three ASs (AS1 300, AS2, 400, AS3 500) must be triggered again.

In step 15 of FIG. 1 the AS1 300 creates again a new SIP request based on the request received. Since the AS1 300 is a B2BUA, as indicated above in step 5 of FIG. 1, it changes the origin of the request (called "From=AS_1" according to AS1 300 in the flow).

Accordingly to step 14 of FIG. 1 the operator has defined an IFC configuration according to which the next priority to be evaluated (priority 5) will contain conditions (SPTs) indicating that only when the session case is "orig_cdiv" AND the origin for the retargeting is AS3 500 then AS2 400 is to be triggered.

However, since AS1 300 changed the origin in step 15 of FIG. 1 from "AS_3" to "AS_1" and the S-CSCF 200 performs an evaluation solely based on the currently received SIP request, the trigger SPTs are not matched and AS2 400 is not fired, i.e. the request is not sent to AS2 400 so that the PREPAID service is not executed for user B. For the same reasons, AS3 500 will not be fired either (if a priority 6 is configured in the same way).

Therefore, the prior art does not provide a mechanism to distinguish which services happened/have been executed before the current request and who, i.e., which AS executed the services.

The forwarding scenario may therefore not be identified at the S-CSCF 200, unless the implementation of the AS with regard to, for example, the SIP header is changed by requiring that SIP headers are not removed or changed. There is thus no way to identify the ongoing scenario without impacting the different AS implementations.

Accordingly, it is an object of the present invention to solve the above described problems. In particular, it is an object of the present invention to provide a mechanism which allows the operator to secure signaling scenarios such as described above independently of the number of ASs involved in the call and the implementation of each AS.

SUMMARY

Suitable method(s), node(s), a system and computer program(s) are defined in the independent claims. Advantageous embodiments are defined in the dependent claims.

In one embodiment, a method of generating dynamic Service Point Triggers, SPTs, in an IP multimedia subsystem, IMS, is provided. This method comprises the step of receiving, at a first node, Initial Filter Criteria, IFC, belonging to a service profile of a user subscribed to said IMS, said IFC including a plurality of preset SPTs, respectively indicating conditions to be evaluated and information including at least one criterion for generating one or more dynamic SPTs. Further, the method comprises the step of evaluating, at said first node, said plurality of preset SPT according to a configured order of priorities. The method further comprises the step of generating, at said first node, if said at least one criterion is met, one or more dynamic SPTs based on said information, whereby said dynamic SPTs indicate respective new conditions to be evaluated.

In another embodiment, a method of generating dynamic Service Point Triggers, SPTs, in an IP multimedia subsystem, IMS, is provided. The method comprises the step of configuring, at a second node, Initial Filter Criteria, IFC, belonging to a service profile of a user subscribed to said IMS, said IFC including a plurality of preset SPTs, respectively indicating conditions to be evaluated and information including at least one criterion for generating one or more dynamic SPTs. The method further comprises the step of providing the configured IFC to a first node during initial registration of the user.

In another embodiment, a first node for generating dynamic Service Point Triggers, SPTs, in an IP multimedia subsystem, IMS, is provided. The first node comprises a communication module that is configured to receive Initial Filter Criteria, IFC, belonging to a service profile of a user subscribed to said IMS, said IFC including a plurality of preset SPTs, respectively indicating conditions to be evaluated and information including at least one criterion for generating one or more dynamic SPTs. The first node further comprises an evaluation module that is configured to evaluate said plurality of preset SPT according to a configured order of priorities. In addition, the first node comprises a generation module, configured to generate, if said at least one criterion is met, one or more dynamic SPTs based on said information, whereby said dynamic SPTs indicate respective new conditions to be evaluated.

In another embodiment, a second node for generating dynamic Service Point Triggers, SPTs, in an IP multimedia subsystem, IMS, is provided. The second node comprises a configuration module adapted to configure Initial Filter Criteria, IFC, belonging to a service profile of a user subscribed to said IMS, said IFC including a plurality of preset SPTs, respectively indicating conditions to be evaluated and information including at least one criterion for generating one or more dynamic SPTs. The second node further comprises a communication module that is configured to providing the configured IFC to the first node during initial registration of the user.

In still another embodiment, a system is provided comprising the above-described first and second nodes.

In still another embodiment, respective computer programs are provided which includes instructions configured, when executed on a single or a plurality of data processors, to cause the single or the plurality of data processors to carry out the above-described methods.

Further, advantageous embodiments of the invention are disclosed in the dependent claims.

Accordingly, the dynamic SPTs provide a memory mechanism at the level of the Service Point Triggers so that operators may secure signaling scenarios independently of the configuration and/or implementation of the number of application servers involved in a call/application/service. As such, the operator is provided with an improved flexibility and control over the further processing, e.g. how to further route, a call/application/service.

BRIEF DESCRIPTION OF THE DRAWINGS

FIG. 8 illustrates a modified XML schema for the Cx diameter interface according to an embodiment.

FIG. 9 illustrates modified XML body changes for the Cx diameter interface according to an embodiment.

FIG. 10 illustrates an example of dynamic SPT definitions according to an embodiment.

FIG. 11 illustrates guidelines for S-CSCF capabilities according to an embodiment.

DESCRIPTION OF THE EMBODIMENTS

In order to achieve the object of the present invention dynamic SPTs are provided.

In particular, these dynamic SPTs are part of IFCs configured by the operator and are provided, e.g. downloaded, from the HSS to S-CSCF during initial IMS registration of a user terminal as part of the corresponding user profile.

More specifically, a dynamic SPT causes, e.g. within the S-CSCF assigned to serve services to the user terminal of said IMS user, the creation/generation of one or more new SPTs. The new dynamically created/generated SPTs having its own specified conditions may be subsequently evaluated, e.g. by said S-CSCF, so as to conditioning the further processing of subsequent service signaling/requests related to services originated by and/or terminating to said user. That is, the newly created/generated SPTs are dynamic SPTs and may be considered as SPTs that are dependent from the original SPTs that have been provided from the HSS to the S-CSCF.

In contrast, the prior art described above only discloses static/preset IFCs and, thus, static or fixed corresponding SPTs, including e.g. static specifying conditions such as: type of SIP request, direction of request, SIP headers present/absent, etc.

In other words, such static SPTs do not lead to a subsequent generation of one or more new SPTs in the S-CSCF. In particular, the prior art does not disclose an S-CSCF that receives information for creating dynamically SPTs. Instead, the prior art discloses just static IFCs, wherein no modification on the SPTs specified by these IFCs are to be executed by a server, e.g. S-CSCF, neither during trigger evaluation, or in any other phase. Thus, in this respect, the concept of the present invention offers a clearly differentiated and technically improved solution.

A dynamic SPT is thus an SPT that is created/generated (by an S-CSCF) e.g. during trigger evaluation which may be set to a certain value when a given trigger priority is matched, i.e. when the conditions/criteria set by a SPT are met, and is used later in subsequent criteria evaluation as an additional new and dynamically created SPT (condition) to the ones currently standardized/preset, that is, the dynamic SPTs can be used standalone or in combination with pre-configured SPTs.

These dynamic SPTs are part of IFC configured by the operator in the service profile stored in HSS in the sense that the IFC include information including one or more criteria for generating new SPTs at the S-CSCF when the criteria are met. This information is provided to the S-CSCF during initial registration of the user as part of the user profile.

Further embodiments of the invention are described with reference to the Figures. It is noted that the following description contains examples only and should not be construed as limiting the invention.

In the following, similar or same reference signs indicate similar or same elements or operations.

Figure 1:
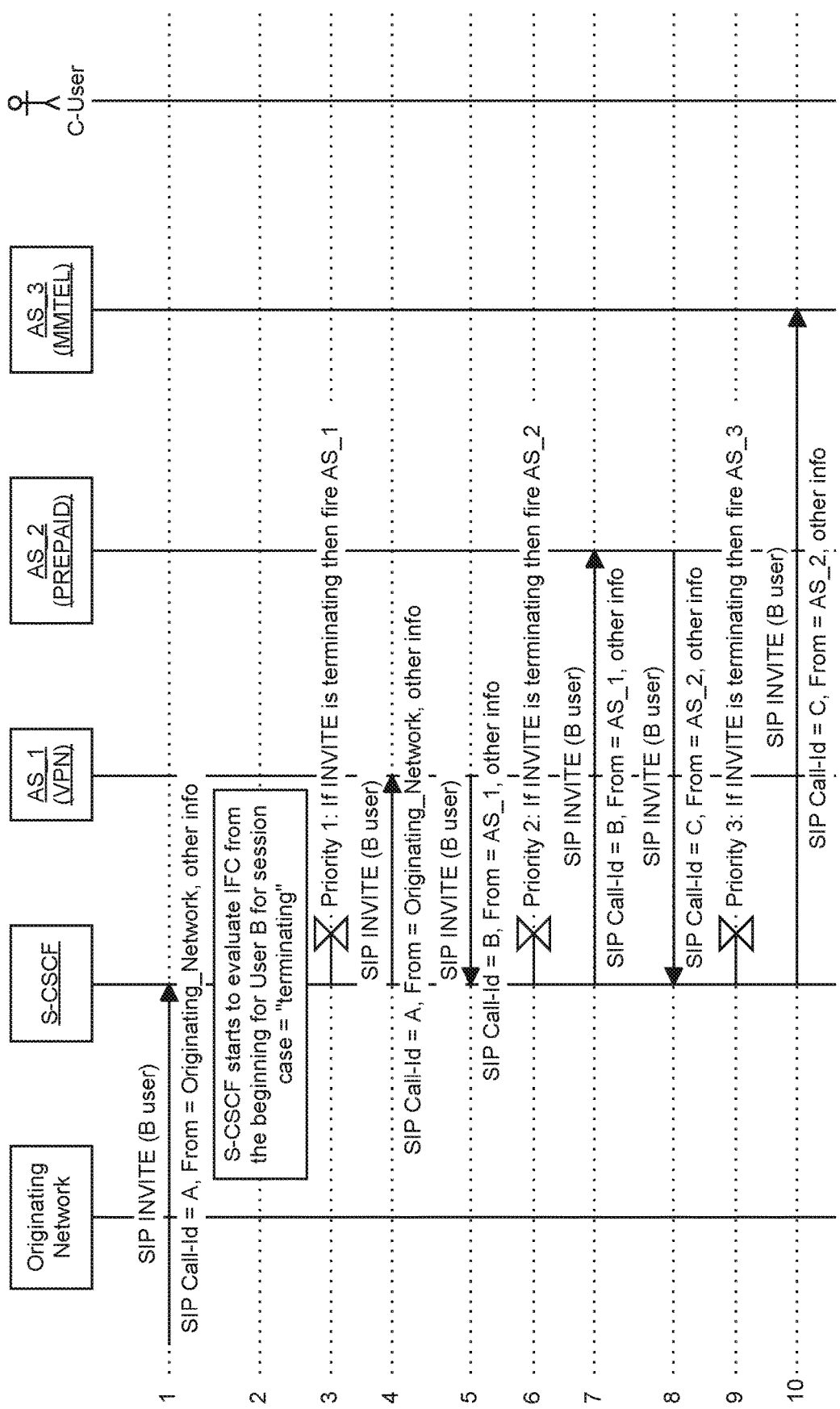
FIG. 1 illustrates a conventional call forwarding scenario to assist the reader in understanding problems of the prior art.
Figure 1:
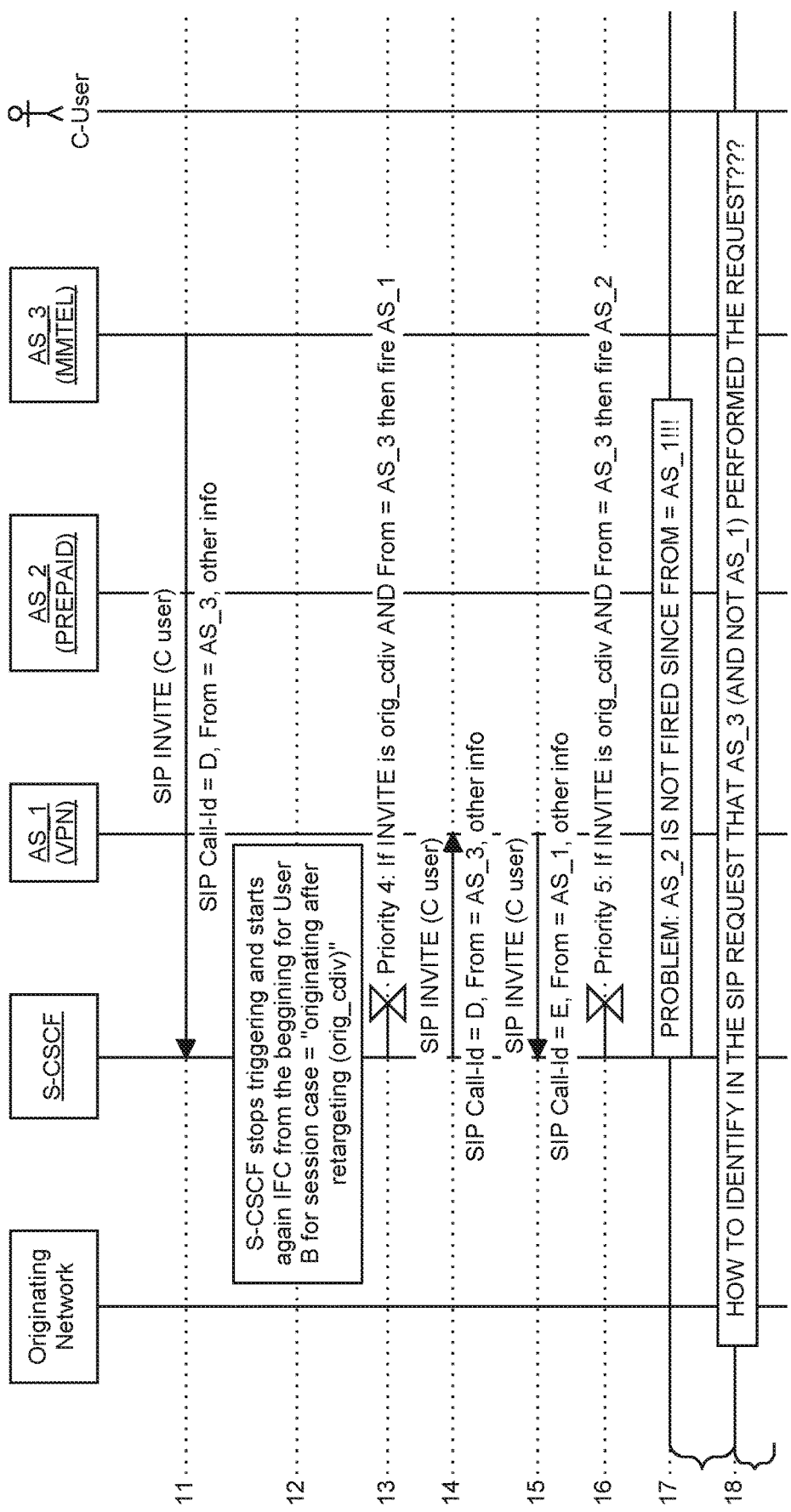
Figure 2:
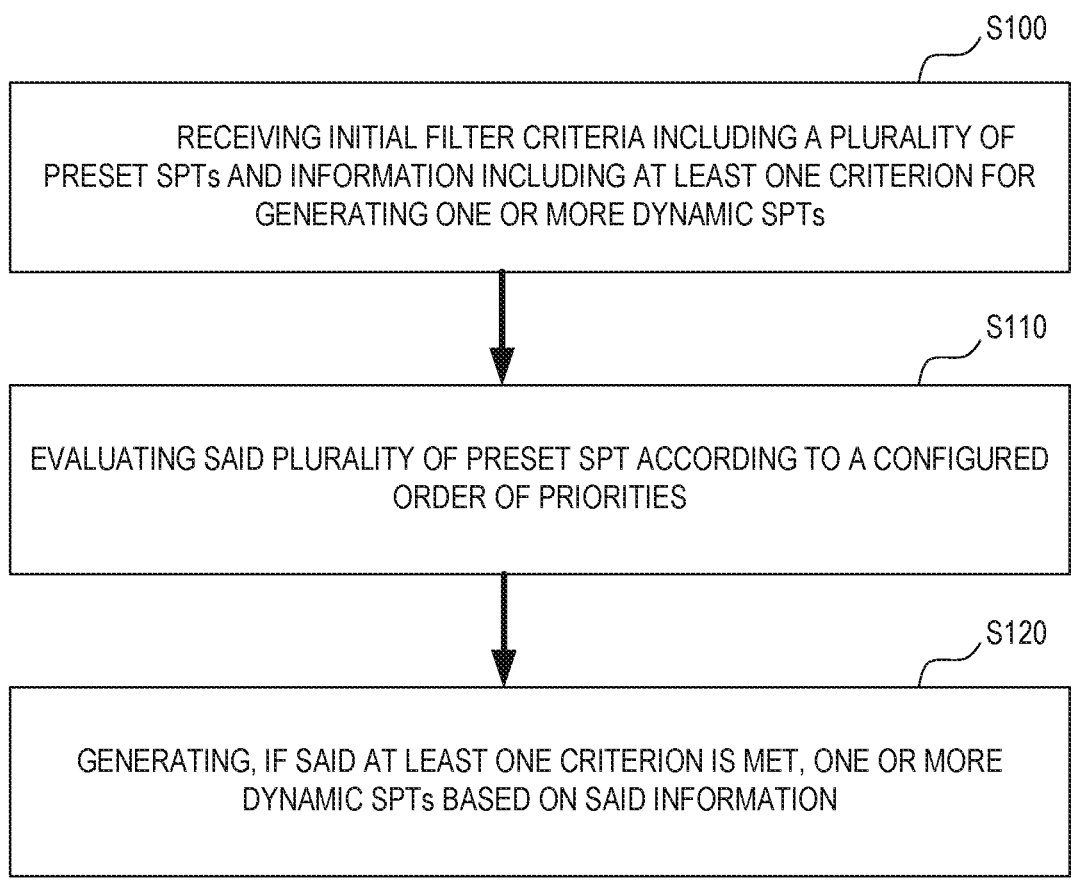
FIG. 2 illustrates operations of a method for generating dynamic SPTs according to an embodiment.

FIG. 2 illustrates a flowchart of a method of generating dynamic SPTs in an IMS. The operations, also referred to as steps in the following, of the method may be carried out by at least one node of a communication system, preferably the node comprising the Serving Call Session Control Function (S-CSCF), in short the S-CSCF 200. For assisting the reader in understanding embodiments of the invention, examples are described by referring to the previously described architecture of a communication system described in FIG. 1. As mentioned above, the function described in FIG. 1 refers to functional elements and may be realized by suitable servers, routers, computers, a combination thereof, etc. as known in the art.

As can be seen in FIG. 2, the method comprises a step S100 in which a first node, preferably the above-mentioned S-CSCF 200, receives IFC. Here, the S-CSCF 200 may be assigned to service calls/services/application to a user terminal (UE) of a user.

The received IFC belong to a service profile of the user subscribing to said IMS, and include a plurality of preset SPTs. The SPTs respectively indicate conditions to be evaluated, such as a type and/or direction of a request, the presence or absence of an SIP header or the like, as described above in FIG. 1. Such conditions may be defined in the form of a name string and may further include a value defined by a value string and a corresponding action to be performed if the condition is met.

In addition, the IFC may further include information including at least one criterion for generating one or more dynamic SPTs. Such a criterion is, for example, fulfilled when the conditions/criteria set by a preset SPT are met at a specific priority. For example, a criterion for generating one or more dynamic SPTs is fulfilled if at priority 4 in FIG. 1 the session case is an "originating after call forwarding or diversion" ("orig_cdiv") session case and the call was forwarded from AS3 500 ("From =AS_3").

In addition, the information may further include one or more information elements that define additional new conditions and/or actions for defining the dynamic SPTs. The information for generating one or more dynamic SPTs may therefore define a setting of the respective new conditions to be evaluated. As will be illustrated below, the setting may refer to defining a name string and may further include a value and a corresponding action to be performed if the condition is met.

As can be seen in FIG. 2, the method further comprises a step S110 in which said plurality of preset SPTs are evaluated according to a configured order of priorities. Here, the configured order of priorities may be included in the received IFC and may thus be configured by an operator. Alternatively, the configured order of priorities may be preset and/or stored at the S-CSCF 200. As described above with regard to FIG. 1, the order of priorities (e.g., Priority 1-Priority 3, Priority 4-Priority 6) may be defined with regard to session cases, and may respectively be associated with a specific application server to be fired. This indicates, for example, that a call is sent/forwarded to AS1 300 if the preset SPT condition at Priority 1 is met. The evaluation, whether a preset SPT condition is met, may, for example, be performed based in the content of the SIP messages or the content of the SIP headers.

As can be seen in FIG. 2, the method further comprises a step S120 in which one or more dynamic SPTs are generated, preferably at the S-CSCF 200, if the above at least one criterion is met. As illustrated above, such a criterion may define a determination whether a condition or all conditions of one of said preset SPTs is/are met at a specific one of said order of priorities.

As described above, the one or more dynamic SPTs are generated based on the information received in the IFC and may be generated at one or more of the configured order of priorities. For example, if at priority 4 in FIG. 1 the session case is an "originating after call forwarding or diversion" ("orig_cdiv") session case and the call was forwarded from AS3 500 ("From=AS_3") and thus a criterion received with the IFC is met at a specific priority, then one or more new conditions are generated. The one or more new conditions may be related to the designation of a specific signaling scenario that is to be remembered and used for evaluations at a subsequent priority (e.g., at subsequent priorities 5 and 6). In the present example, a new condition may be defined to indicate that the call was forwarded from AS3 500, and may include a name and a value. Here, the name may indicate a session case, e.g. "cdiv", and the value may indicate a specific application server, e.g. "AS_3". As such, a dynamically generated SPT may be set as "cdiv=AS_3" and defines a new condition that is used for evaluations at a subsequent priority. According to the new condition ("cdiv=AS_3"), a specific scenario in the signaling scenario is thus remembered at a later point in the signaling scenario, and may thus be used for evaluation at a subsequent priority. In addition, the dynamically generated SPT may further include a corresponding action that should be performed when the new condition is met at a specific subsequent priority. For example, if the new condition ("cdiv=AS_3") is fulfilled at the subsequent priority 5, then the corresponding action indicates that the call should be sent to AS2 400, i.e. to fire AS2 400.

Accordingly, the dynamically generated SPTs can be used to appropriately indicate which application server has performed a request in the past and which corresponding action(s) should be performed in subsequent steps of the signaling scenario. Evaluating the received IFC therefore becomes independent on the specific implementation of the application server, for example, independent on whether the origin of the request is changed by the application server.

The dynamic SPTs therefore indicate respective new conditions to be evaluated. These are "new" conditions because they are not defined by the preset SPTs. As described above, such a new condition defined by a dynamic SPT may indicate a signaling scenario, e.g. "call forwarding by AS3". That is, if a specific signaling scenario has occurred, e.g. call forwarding initiated by AS3, then this specific signaling scenario is "memorized" due to the dynamic SPT, regardless of SIP information/header modification/removal/addition by other ASs. Therefore, an SIP request may be evaluated in dependence from other priorities, i.e. the signaling scenario evaluated at another previous priority influences the condition to be evaluated at the present or subsequent priority.

In other words, the dynamic SPTs appropriately introduce an SPT memory mechanism according to which an indication is provided as to the type of service that previously before a current request and/or which application server executed the service previously and/or which information was previously included in the previous requests. As such, the processing at the S-CSCF 200 becomes independent of the processing of requests at the application servers.

Figure 3:
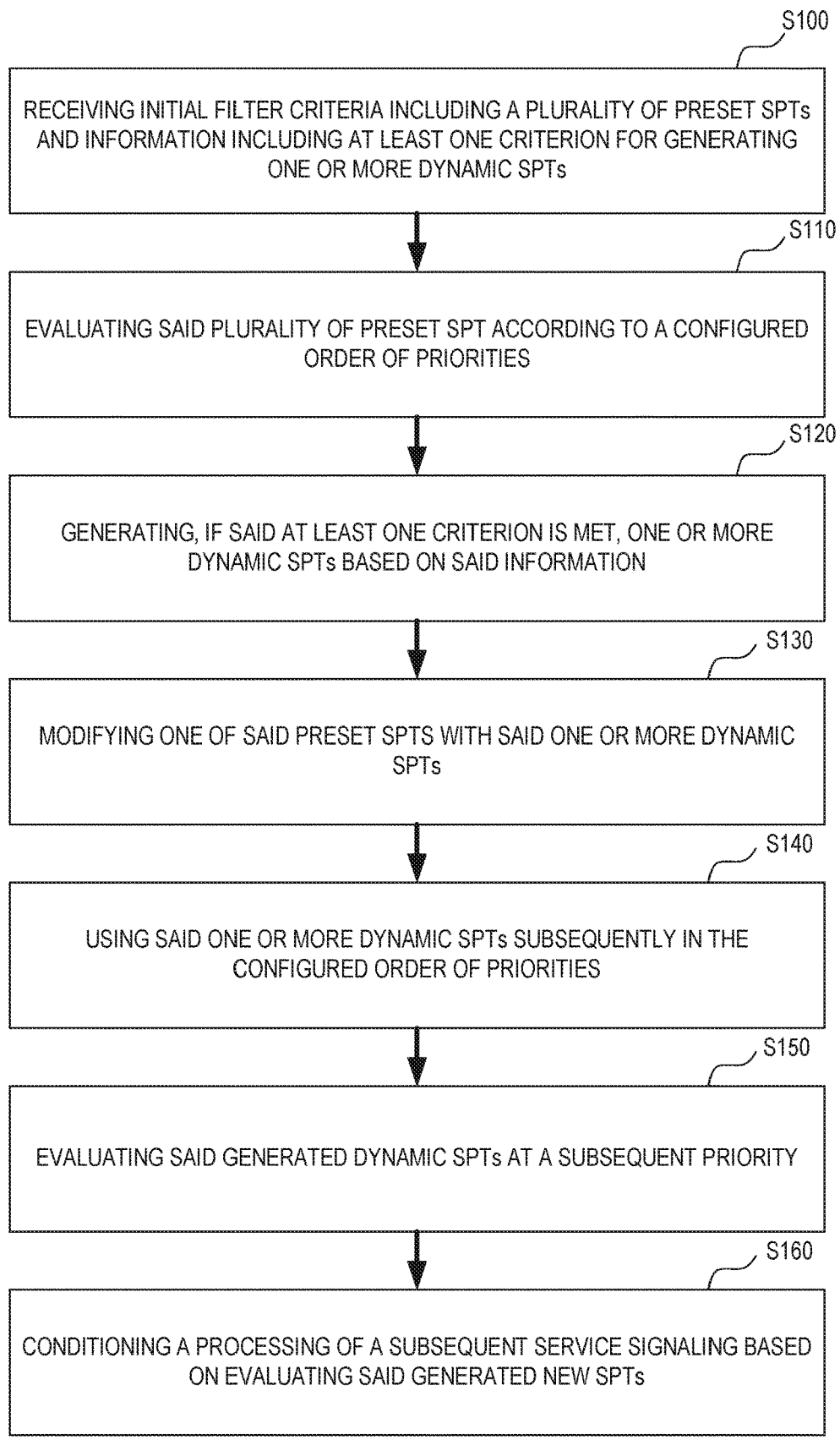
FIG. 3 illustrates operations of a method for generating dynamic SPTs according to another embodiment.

FIG. 3 illustrates a flowchart of preferred embodiments of the method for generating dynamic SPTs in an IMS. Here, the steps S100, S110, and S120 of FIG. 3, which are respectively known from FIG. 2, are preferably performed by the S-CSCF 200. The steps S130, S140, S150, and S160 of FIG. 3 (to be described below) are also preferably performed by the S-CSCF 200.

According to a preferred embodiment of the present invention illustrated in step S130 of FIG. 3, the method may further include the step S130 of modifying at least one of the preset SPTs with one or more dynamic SPT. For example, the preset SPT shown in step 16 of FIG. 1 according to which at priority 5 the condition $$\text{If INVITE is orig\_cdiv AND From=AS\_3} \quad (1)$$

is evaluated to potentially trigger the action "then fire AS_2" in case this condition is met is modified to identify the appropriate signaling scenario, i.e. that AS3 500 has performed the request and not AS1 300 as indicated in the SIP message returned in step 15 of FIG. 1. Accordingly, the preset SPT may be modified by altering or replacing the preset SPT with one or more dynamically generated SPT. Here, the above condition at the respective priority may be modified by using the dynamically generated SPT of $$\text{cdiv=AS\_3} \quad (2)$$

instead of the preset SPT, and may further include an appropriate action, e.g. "then fire AS_2". Accordingly, the dynamically generated SPT indicates the session case ("originating after retargeting") and the appropriate signaling scenario, i.e. that AS3 500 has performed the request.

The modifying step S130 may occur during trigger evaluation, i.e. when priority and preset SPT condition are evaluated (in step 16 of FIG. 1 when evaluating priority 4), or in a subsequent phase, for example, when a subsequent priority and preset SPT condition is about to be evaluated.

According to another preferred embodiment of the present invention, the modifying of the at least one preset SPT may be performed by reducing the number of conditions to be evaluated for the preset SPT, for example at a specific one of said order of priorities, to a reduced number of new conditions to be evaluated for the dynamic SPT. For example, as described above with regard to the preset SPT condition (1) at priority 5 of step 16 of FIG. 1, using instead the dynamically created SPT condition (2) reduces the number of conditions to be evaluated from 2 to 1.

According to another preferred embodiment of the present invention illustrated in step S140 of FIG. 3, the method may further include the step of using the one or more dynamically generated SPTs subsequently in the configured order of priorities. As such, one or more dynamic SPTs, generated at a first priority when the received criterion is fulfilled, may be used as a replacement condition at a respective subsequent priority to appropriately remember the signaling flow at the first. The preset SPTs that conventionally are independent from each other are therefore replaced, at least in part, by one or more dynamic SPTs that appropriately indicate a history of the signaling scenario or signaling flow. Therefore, the dynamic SPT used at a subsequent priority may indicate a particular signaling scenario at a preceding priority. Here, the dynamic SPTs may be used standalone, e.g. instead of using the above condition (1) the dynamic SPT according to condition (2) is used, or in combination with a preset SPT.

According to another preferred embodiment of the present invention illustrated in step S150 of FIG. 3, the method may further include the step of evaluating said generated dynamic SPTs at a subsequent priority. This means that the dynamically generated SPTs are evaluated to determine whether an action, configured in association with the dynamic SPT and/or configured in association with a subsequent priority, should be performed or not. In the above example of the dynamic SPT according to condition (2), this condition is fulfilled because the AS3 500 initiated the call forwarding, and therefore an associated action may be to trigger call forwarding to AS2 400 ("fire AS_2") or AS3 ("fire AS_3").

According to another preferred embodiment of the present invention illustrated in step S160 of FIG. 3, the method may further include the step of conditioning a processing of a subsequent service signaling based on evaluating said generated dynamic SPTs. As indicated above, the service signaling may be related to services that are originated by the user and/or are terminated by the user. The service signaling or signaling scenario, e.g. call forwarding to respective application servers, may thus be conditioned by applying the respective new conditions of the dynamic SPTs. The appropriate processing flow to reach the respective application servers in a predetermined order may thus be guaranteed in a way that is independent of the processing of the signaling at the application servers.

According to another preferred embodiment of the present invention (not illustrated in FIG. 3) the generation of the one or more dynamic SPTs may further include generating a dynamic SPT to indicate that a subsequent service signaling does not has to be sent to an application server. As will be illustrated in further detail below, such a dynamic SPT may be used to indicate that no more services or APs are to be fired. In the example of call forwarding, the call may thus be readily routed towards the destination 600 (user C). This ensures that lower (subsequent) priorities may not be matched and the processing may be terminated earlier.

Figure 4:
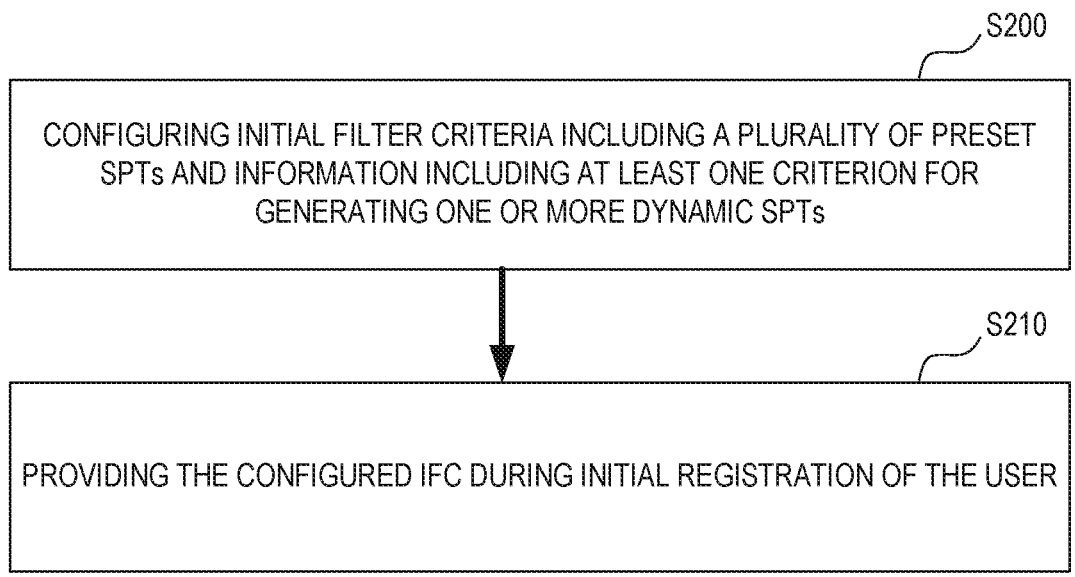
FIG. 4 illustrates operations of a method for generating dynamic SPTs according to another embodiment.

FIG. 4 illustrates a flowchart of a method of generating dynamic SPTs in an IMS. The operations, again referred to as steps in the following, of the method may be carried out by at least one node of a communication system, preferably the Home Subscribe Server (HSS) 100.

As can be seen in FIG. 4, the method comprises a step S200 in which a second node, preferably the above-mentioned HSS 100, performs a configuring of the above-described Initial Filter Criteria, IFC, belonging to the service profile of a user (UE) subscribed to said IMS. As described above, the IFC include a plurality of preset SPTs which respectively indicate conditions to be evaluated as well as information including at least one criterion for generating the one or more dynamic SPTs.

As can be further seen in FIG. 4, the method also comprises the step S210 in which, preferably upon receiving a request for the service profile of user, the configured IFC are provided to a first node, preferably said S-CSCF 200, during initial registration of the user.

Here, if the IFC are transmitted from the HSS 100 to the S-CSCF 200, then the IFC are transmitted via the so-called Cx interface, as known to the skilled person.

Figure 5:
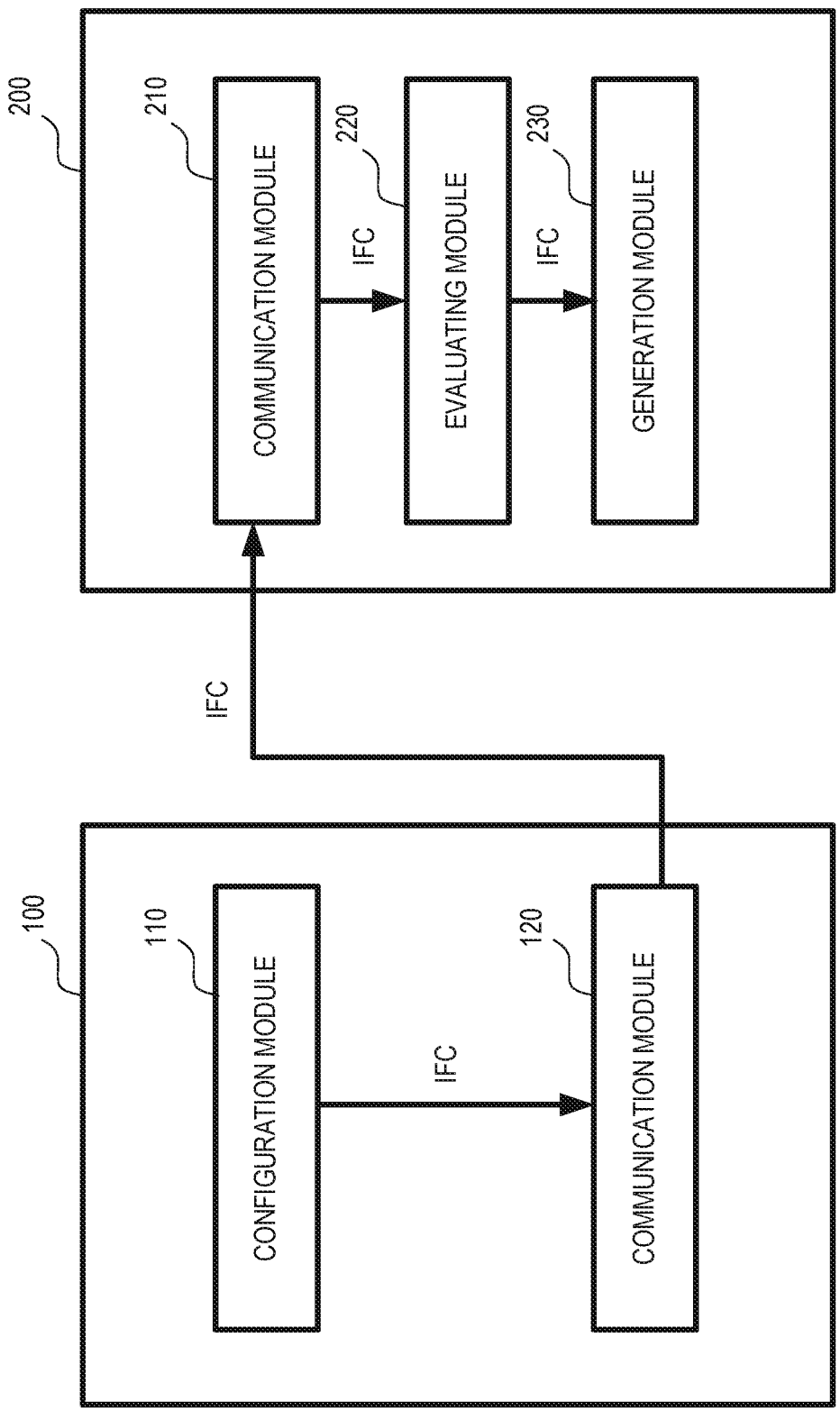
FIG. 5 illustrates elements of a first node and elements of a second node for generating dynamic SPTs according to an embodiment.

As can be seen from FIG. 5, the node 200 (a first node), which is preferably the S-CSCF 200, comprises a communication module 210, an evaluating module 220, and a generation module. The respective modules/units may be tangible elements or software functions running on one or a plurality of processors.

The communication module 210 (communication unit 210) of node 200 in FIG. 5 is configured to receive the Initial Filter Criteria, IFC, belonging to a service profile of a user subscribed to said IMS. As described above, the IFC include a plurality of preset SPTs that respectively indicate conditions to be evaluated as well as information including at least one criterion for generating the one or more dynamic SPTs.

Further, the evaluation module 220 (evaluation unit 220) of node 200 in FIG. 5 is configured to evaluate the plurality of preset SPT according to the configured order of priorities.

In addition, the generation module 230 (generation unit 230) of node 200 in FIG. 5 is configured to generate, if the at least one criterion is met, the one or more dynamic SPTs based on the information, whereby the dynamic SPTs indicate respective new conditions to be evaluated.

Accordingly, the same advantages which are achieved with the above-described methods can also be achieved by the node 200. For more details, it is referred to the above discussion to avoid unnecessary repetition.

As can be further seen from FIG. 5, the node 100 (a second node), which is preferably the HSS 200 comprises a configuration module 110 and a communication module 120.

The configuration module 110 (configuration unit 110) of node 100 in FIG. 5 is adapted to configure the IFC belonging to the service profile of the user subscribed to the IMS. As described above, the IFC include the plurality of preset SPTs, respectively indicating conditions to be evaluated and information including at least one criterion for generating the one or more dynamic SPTs.

In addition, the communication module 120 (communication unit 120) of node 100 in FIG. 5 is configured to provide the configured IFC to the first. node 200 during the initial registration of the user.

Accordingly, the same advantages which are achieved with the above-described methods can also be achieved by the node 100. For more details, it is referred to the above discussion to avoid unnecessary repetition.

According to another preferred embodiment the first node 200 may further comprise a modifying module 240 (modifying unit 240) that is configured to modify at least one of said preset SPTs with said one or more dynamic SPT. Preferably, the modifying module 240 is further configured to reduce a number of conditions to be evaluated for said preset SPT to a reduced number of said new conditions to be evaluated for said dynamic SPT. For more details, it is referred to the above discussion with regard to the modification of the preset SPTs to avoid unnecessary repetition.

Another embodiment of the present invention is a system that comprises the above first node 200, preferably the S-CSCF 200, and the above second node 100, preferably the HSS.

Figure 6:
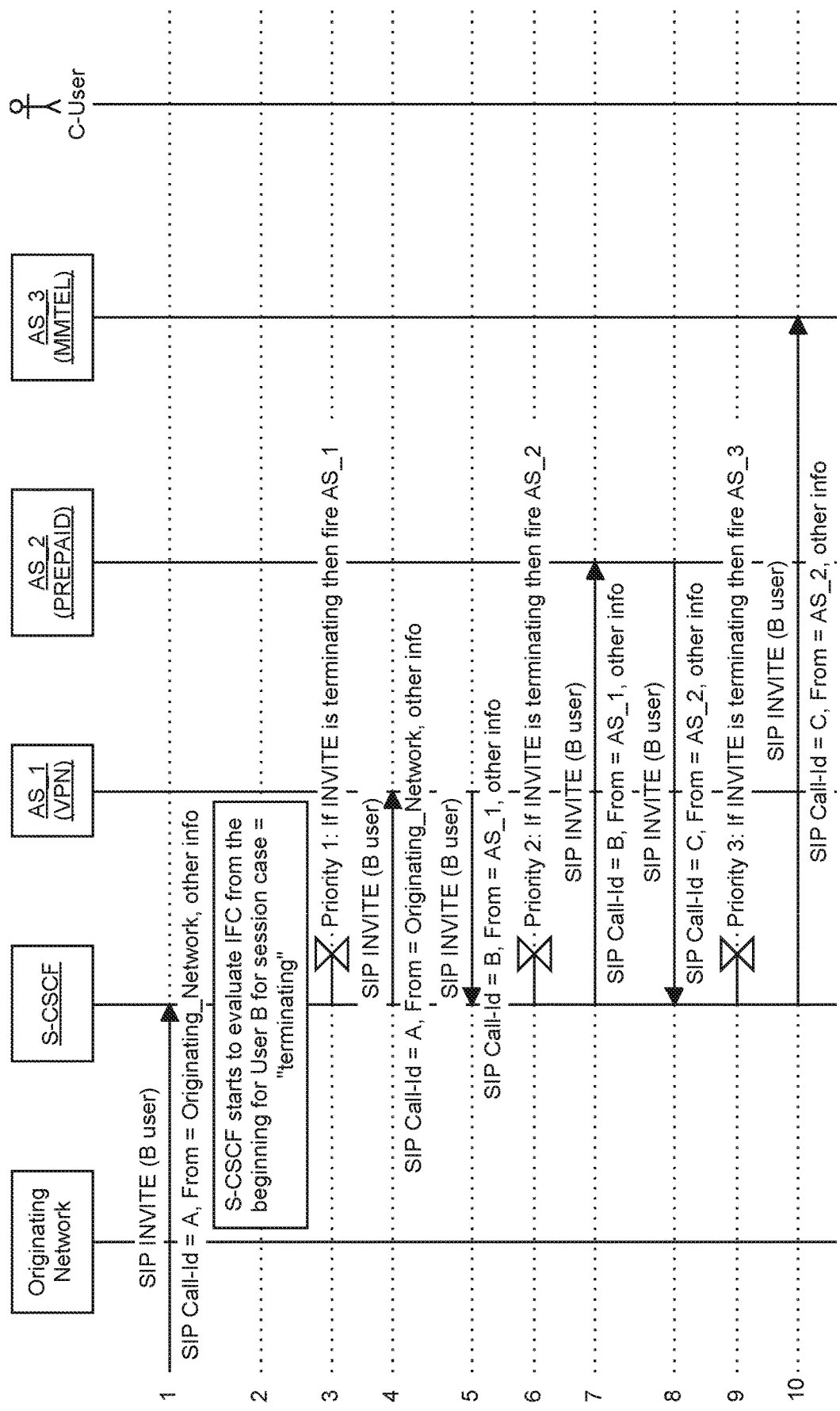
FIG. 6 illustrates a call forwarding scenario according to an embodiment.
Figure 6:
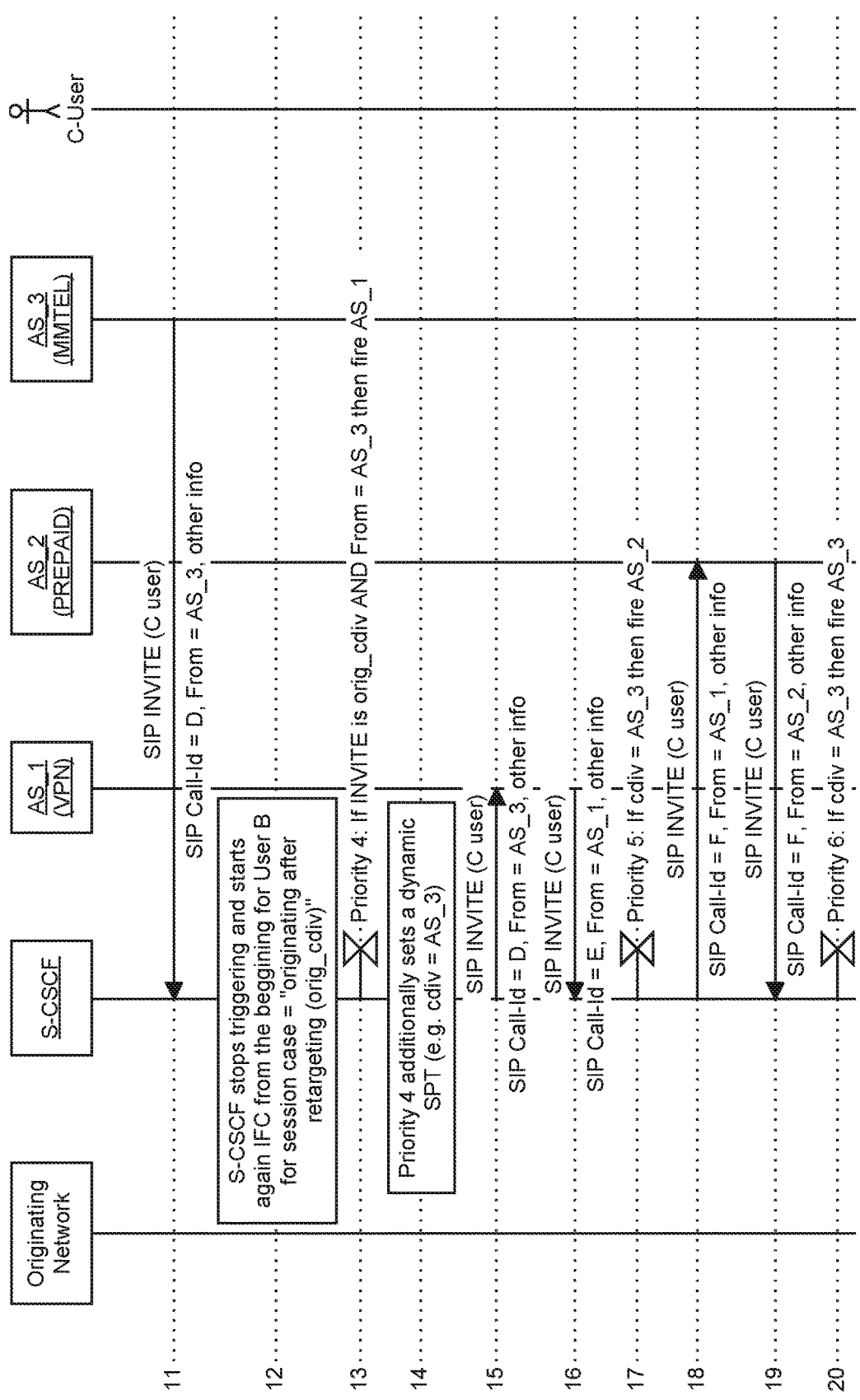
Figure 6:
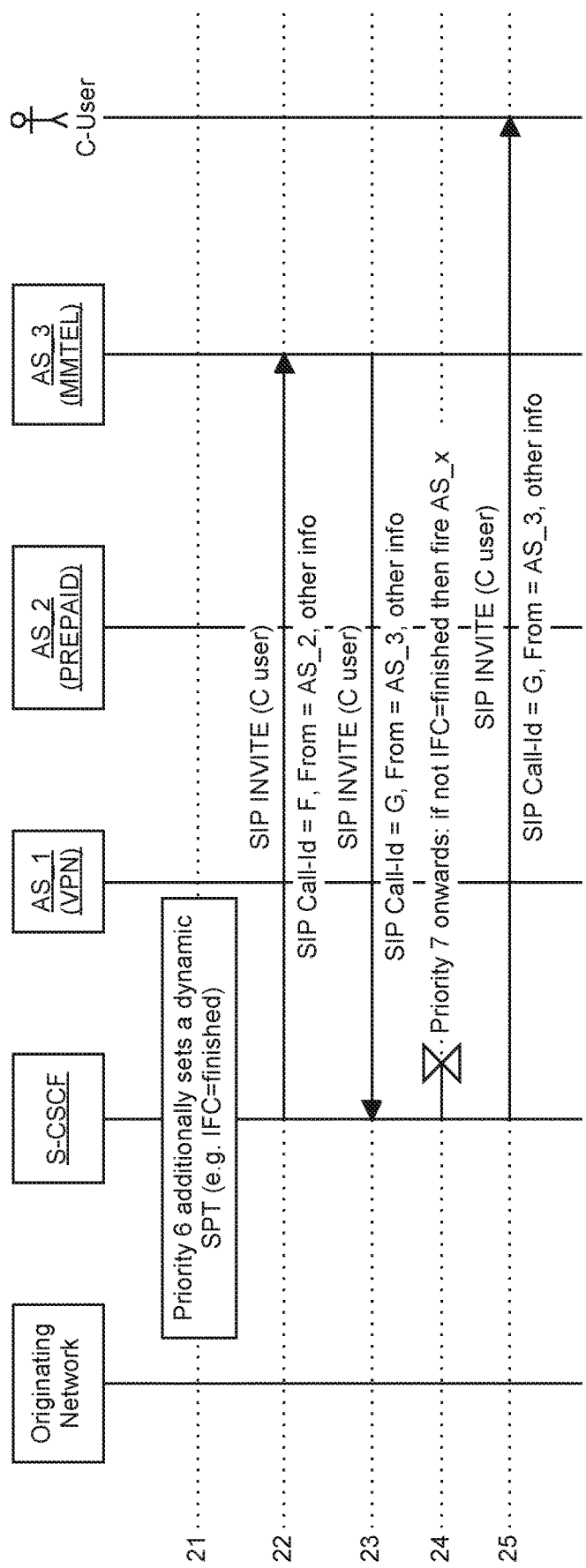

FIG. 6 shows another alternative embodiment. The steps 1-12 of FIG. 6 are the same as in FIG. 1.

Upon detection of the destination change from user B to user C, in step 13 of FIG. 6 the operator has defined a configuration according to which the first priority to be evaluated for this session case (priority 4, since priorities 1-3 are not matched due to the configured session case "terminating" which differs from current session case "orig_cdiv" being evaluated) will contain conditions (SPTs) indicating that only when session case="orig_cdiv" (i.e. "originating after call forwarding or diversion") AND when the origin application server for the retargeting is AS_3 (AS3 500) then AS_1 (AS1 300) is to be triggered, that is, only when AS3 600 is the one application server that executes call forwarding, the originating services for the forwarding B-user are to be executed.

In step 14 of FIG. 6, because all conditions/criteria of the SPT in priority 4 of step 12 in FIG. 6 are met, i.e. a criteria to generate a dynamic SPT is fulfilled, according to the configuration defined by the operator a dynamic SPT is generated as part of the priority 4 configuration to identify the signaling scenario. In the present example, the dynamic SPT is "cdiv=AS_3" indicating the condition that AS3 600 is the application server that executes call forwarding. In other words, the dynamic SPT is generated in order to "remember" throughout the whole end-to-end signaling scenario a SIP request indicated "call forwarding by AS_3" regardless of any SIP information/header modification/removal/addition by another ASs in the signaling chain (given that, as said before, each priority only bases on the latest SIP request received and it is evaluated independent from the other priorities).

This dynamic SPT(s) may be fully configurable, i.e. when priority 4 is fired, a dynamic SPT name ("cdiv") is created and dynamic SPT value ("AS_3") is set. It is again noted that multiple instances of dynamic SPTs may be created/set for the signaling scenario discussed. For example, the operator may also configure two dynamic SPTs (e.g. "scenario=call-forwarding-to-C-user" AND "service=MMTel"). Multiple instances of dynamic SPTs may provide a better flexibility, since depending on a subsequent trigger evaluation, only part of them may be used as additional SPTs.

In step 15 of FIG. 6, the S-CSCF 200 subsequently sends the request to AS1 300 so that VPN services are executed for user B. It is noted that this call handled now is from the forwarding B-user towards the forwarded-to C-User, so the three ASs 300, 400, and 500 must be triggered again.

In step 16 of FIG. 6, the AS1 300 creates a new SIP request based on the request received. Since the AS1 300 is a B2BUA, it changes the origin of the request (called "From=AS_1" in the flow).

In step 17 of FIG. 6, the operator has configured that the next priority to be evaluated (priority 5) will contain a single condition (SPT) indicating that when dynamically created SPT "cdiv" is equal to "AS_3", i.e. the condition dynamically created in step 14 of FIG. 6 is fulfilled, AS_2 is to be triggered, i.e. the call is forwarded to AS2 400.

It is to be noted that the dynamically created SPT "cdiv" may already imply the other conditions required to be configured with current 3GPP mechanism, that is, the dynamically created SPT "cdiv=AS_3" is equivalent to SPTs "SIP request=INVITE AND "session-case=orig_cdiv" AND "From=AS_3". In such a case there is no need for combining dynamic and pre-configured SPTs. By using dynamic SPTs the configuration of the rest of or other priorities may be much simpler.

In step 18 of FIG. 6, the S-CSCF 200 sends the request to AS2 400 so that Pre-Paid services are executed for user B.

In step 19 of FIG. 6, AS2 400 creates a new SIP request based on the request received. Since the AS2 400 is a B2BUA, it changes the origin of the request (called "From=AS_2" in the flow).

In step 20 of FIG. 6, the operator has configured that the next priority to be evaluated (priority 6) will (again) contain a single condition (SPT) indicating that when dynamic SPT "cdiv" is equal to "AS_3", AS_3 is to be triggered, i.e. the call is forwarded to AS3 500.

In step 21 of FIG. 6, the operator has defined a configuration so that in this situation, i.e. under the criteria that the signaling scenario reaches the last AS (AS3 500) in the order, another dynamic SPT is generated (as part of the priority 6 configuration) to indicate that no more triggers are to be matched, i.e. no more services/ASs are to be fired and the call has to be routed towards the destination 600 (user C).

It is to be noted that this setting/creation of the dynamic SPT "IFC=finished", i.e. the evaluation of the IFC is finished for this session case, is optional but desired to ensure that triggers with lower priority (priority 7 onwards), which will be evaluated after firing AS3 500, are not matched in this signaling scenario.

In step 22 of FIG. 6, the S-CSCF 200 sends the SIP request to AS3 500 so that MMTel services are executed for user B.

In step 23 of FIG. 6, AS3 500 creates a new SIP request based on the request received. Since the AS3 500 is a B2BUA, it changes the origin of the request (called "From=AS_3" in the flow).

In step 24 of FIG. 6, the operator has defined a configuration according to which the next priorities to be evaluated (priority 7 onwards) contain a negated dynamic SPT, so that regardless of the SIP request received from AS3 500 and the preconfigured/preset SPTs, the conditions (pre-configured or dynamically generated) do not find a match.

In the example of step 24 of FIG. 6, the negated newly created condition "NOT IFC=finished" (to fire a different application server AS_x) implies also the conditions "request=INVITE" AND "session-case=orig_cdiv" due the nature of dynamically created SPTs to "remember" the signaling scenario.

It is to be noted that the evaluation of this dynamic SPT "IFC=finished" is optional but desired to ensure that triggers with lower priority (priority 7 onwards) are not fired in this signaling scenario.

It is also to be noted that if dynamic SPT "IFC" is configured in priority 7 and it was not previously created/set in step 21 of FIG. 6, the trigger will fire since in this case dynamic SPT "IFC" is considered to have the value "null" when checked against the value configured in priority 7 (IFC="finished"). As an implementation option, the S-CSCF 200 may raise an alarm indicating that a "negated dynamic SPT value is not set" in order to alert the operator about the situation that a negated specific value for a dynamic SPT will always match value "null".

In step 25 of FIG. 6, since no more triggers evaluated find a match with configured/preset SPTs, the S-CSCF 200 sends the request to the destination 600 (user C).

In order to implement the dynamic SPTs, changes may be required in the diameter interface (Cx) between the HSS 100 and the S-CSCF 200. In particular, the Cx interface (3GPP TS 29.228) may be that the information as to the generation of the new dynamic SPTs is accommodated in the provided Initial Filter Criteria (IFC).

Figure 7:
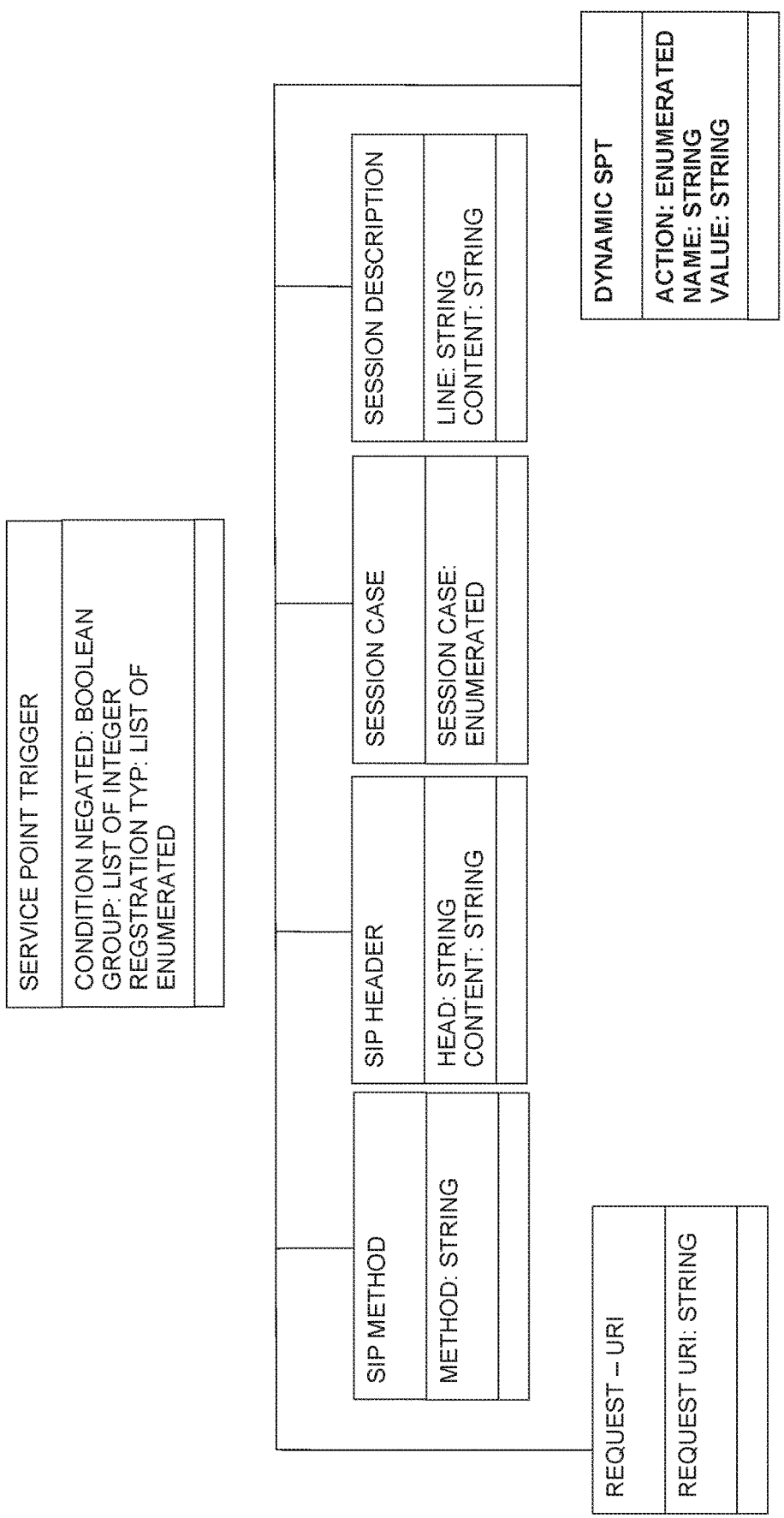
FIG. 7 illustrates a modified SPT UML according to an embodiment.

FIG. 7 shows an example of a modified SPT UML indicating an implementation of the SPT (see 3GPP TS 29.228, Annex B.2.3) that now further includes the information as to the generation of the new dynamic SPTs as described above. In particular, the dynamic SPTs configuration further includes respective dynamic SPT names and values and a corresponding action as described above.

In addition, FIG. 8 shows an example of Cx interface XML schema changes for the user profile. In particular, FIG. 8 shows how the XML schema for the user profile (see 3GPP TS 29.228, Table E.2), in addition to the format of the existing pre-configured/preset (i.e. "static") SPTs, additionally includes an information format with regard to the dynamic SPTs (indicated by a "DynamicSPTxxx" string, for example "tDynamicSPT", "tDynamicSPTAction", "tDynamicSPTName", etc).

Furthermore, FIG. 9 shows an example of XML body changes to be sent over the Cx diameter interface as part of IFC XML schema, again including an information format of the dynamic SPT (indicated by the "DynamicSPTxxx" string format discussed with regard to FIG. 8).

In addition, FIG. 10 shows an example of dynamic SPTs for the trigger priorities 4 and 5 shown above in FIG. 6 with regard to the call forwarding problem. This example may, for example, be added to Annex C of 3GPP TS 29.228.

More specifically, according to the example shown in FIG. 10, the expression for priority 4 (in FIG. 6) to fire AS_1 may be defined as:

Method="INVITE" AND Header="Contact"
        Content="AS_3" AND
        SessionCase="ORIG_CDIV" CREATE_AND_
        SET_DYNAMIC_SPT name "cdiv" value
        "AS_3

In addition, according to the example shown in FIG. 10, the expression for priorities 5 and 6 (in FIG. 6) to fire AS_2 and AS-3 respectively may be defined as:

EVALUATE_DYNAMIC_SPT name "cdiv" value
        "AS_3"

FIG. 11 further shows an example of an additional information element to be included in the guidelines for the S-CSCF capabilities (see 3GPP TS 29.228, table 6.7). In particular, the S-CSCF guidelines may be updated with a new capability so that users with a user profile using dynamic SPTs handling are allocated in an S-CSCF supporting the new user profile XML schema.

The above respective modules/units may be implemented by a processing unit that include one or a plurality of processors, a microprocessor or other processing logic that interprets and executes instructions stored in a main memory. The main memory may include a RAM or other type of dynamic storage device that may store information and instructions for execution by the respective modules/units. For example, the evaluation module and/or the generation module discussed above with respect to FIG. 5 may be realized by the processing unit. The ROM may include a ROM device or another type of static storage device that may store static information and instructions for use by the processing unit.

As mentioned above, the nodes 100 and 200 may perform certain operations or processes described herein. The nodes 100 and 200 may perform these operations in response to the processing unit executing software instructions contained in a computer-readable medium, such as the main memory, ROM and/or storage device. A computer-readable medium may be defined as a physical or a logical memory device. For example, a logical memory device may include memories within a single physical memory device or distributed across multiple physical memory devices. Each of the main memory, ROM and storage device may include computer-readable media with instructions as program code. The software instructions may be read into the main memory for another computer-readable medium, such as a storage device or from another device via the communication interface.

The software instructions contained in the main memory may cause the processing unit(s) including a data processor, when executed on the processing unit, to cause the data processor to perform operations or processes described herein. Alternatively, hard-wired circuitry may be used in place or on in combination with the software instructions to implement processes and/or operations described herein. Thus, implementations described herein are not limited to any specific combination of hardware and software.

The physical entities according to the different embodiments of the invention, including the elements, units, modules, nodes and systems may comprise or store computer programs including software instructions such that, when the computer programs are executed on the physical entities, steps and operations according to the embodiments of the invention are carried out, i.e. cause data processing means to carry out the operations. In particular, embodiments of the invention also relate to computer programs for carrying out the operations/steps according to the embodiments of the invention, and to any computer-readable medium storing the computer programs for carrying out the above-mentioned methods.

Where the term module is used, no restrictions are made regarding how distributed these elements may be and regarding how gathered these elements may be. That is, the constituent elements/modules/units of the nodes 100 and 200 and systems may be distributed in different software and hardware components or other devices for bringing about the intended function. A plurality of distinct elements/modules may also be gathered for providing the intended functionality. For example, the elements/modules/functions of the node may be realized by a microprocessor and a memory similar to the above node including a bus, a processing unit, a main memory, ROM, etc. The microprocessor may be programmed such that the above-mentioned operation, which may be stored as instructions in the memory, are carried out.

Further, the elements/modules/units of the nodes or systems may be implemented in hardware, software, Field Programmable Gate Arrays (FPGAs), Application-Specific Integrated Circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

From the above discussion, the skilled person becomes aware that the configuration of dynamic SPTs provides full control to operators when it comes to trigger evaluation/service invocation. Specifically, the operator will no longer depend on the Application Servers implementation when it comes to SIP headers that may be modified/added/removed throughout the whole AS chain or throughout the signaling scenario.

The skilled person becomes also aware that the configuration of dynamic SPTs further allows a trigger that includes ("remembers") the knowledge about previous triggers ("memory mechanism"), instead of being evaluated in an isolated and independent manner with the latest SIP request as the only information basis.

The skilled person becomes also aware that the configuration of dynamic SPTs substantially decreases the complexity of the trigger configuration and facilitates the maintenance of the users' service profiles, since a large number of eventually complex (static) SPTs conditions can be implied ("remembered") and therefore replaced with a single dynamic SPT.

In addition, the skilled person recognizes that the configuration of dynamic SPTs saves bandwidth over the Cx interface, since the SPT's conditions to be sent from HSS towards S-CSCF are decreased.

In addition, the skilled person recognizes that the configuration of dynamic SPTs also provides flexibility with regard to the adaptation to different AS vendors that are required or not required to be involved depending on the signaling scenarios.

It will be apparent to those skilled in the art that various modifications and variations can be made in the entities/nodes and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

ABBREVIATIONS

3GPP $3^{rd}$ Generation Partnership Project
AS Application Server
B2BUA Back-to-Back User Agent
CSCF Call Session Control Function (may implement different roles: I-CSCF "interrogating", P-CSCF "proxy", and S-CSCF "serving")
HSS Home Subscriber Protocol
SPR Service Point Trigger
UE User Equipment (User Terminal)
IMS Internet Protocol Multimedia Subsystem
XML Extensible Markup Language
SIP Session Initiation Protocol
VoIP Voice over IP calls
IM CN IP multimedia core network
VPN Virtual Private Network
VoLTE Voice over LTE
MMTEL Multimedia Telephony Services
UML Unified Modeling Language

The invention claimed is:
1. A method of generating dynamic Service Point Triggers (SPTs) in an IP multimedia subsystem (IMS) said method comprising:

receiving, at a first node, Initial Filter Criteria (IFC) belonging to a service profile of a user subscribed to said IMS, said IFC including a plurality of preset SPTs, respectively indicating conditions to be evaluated, and information including at least one criterion for generating one or more dynamic SPTs;

evaluating, at said first node, said plurality of preset SPTs according to a configured order of priorities;

generating, at said first node, if said at least one criterion is met, one or more dynamic SPTs based on said information, whereby said dynamic SPTs indicate respective new conditions to be evaluated.

2. The method of claim 1, wherein said criterion defines a determination whether a condition or all conditions of one of said preset SPTs is/are met at a specific one of said order of priorities.

3. The method of claim 1, wherein said information for generating one or more dynamic SPTs defines a setting of said new conditions to be evaluated.

4. The method of claim 3, wherein said set new condition indicates a signaling scenario.

5. The method of claim 1, further comprising:
modifying, at said first node, at least one of said preset SPTs with said one or more dynamic SPT.

6. The method of claim 5, wherein said modifying comprises reducing a number of conditions to be evaluated for said preset SPT to a reduced number of said new conditions to be evaluated for said dynamic SPT.

7. The method of claim 1, further comprising:
using, at said first node, said one or more dynamic SPTs subsequently in the configured order of priorities.

8. The method of claim 1, further comprising:
evaluating, at said first node, said generated dynamic SPTs at a subsequent priority.

9. The method of claim 1, further comprising:
conditioning, at said first node, a processing of a subsequent service signaling based on evaluating said generated dynamic SPTs.

10. The method of claim 1, wherein
said generating, at said first node, further includes generating a dynamic SPT to indicate that a subsequent service signaling does not have to be sent to an application server.

11. The method of claim 1, wherein said first node is a S-CSCF.

12. A method of generating dynamic Service Point Triggers (SPTs) in an IP multimedia subsystem (IMS) said method comprising:
configuring, at a second node, Initial Filter Criteria (IFC) belonging to a service profile of a user subscribed to said IMS, said IFC including a plurality of preset SPTs, respectively indicating conditions to be evaluated and information including at least one criterion for generating one or more dynamic SPTs;
providing the configured IFC to a first node during initial registration of the user.

13. The method of claim 12, wherein said second node is a HSS and said first node is a S-CSCF.

14. A first node for generating dynamic Service Point Triggers (SPTs) in an IP multimedia subsystem (IMS), said first node comprising:
a communication module, configured to receive Initial Filter Criteria (IFC) belonging to a service profile of a user subscribed to said IMS, said IFC including a plurality of preset SPTs, respectively indicating conditions to be evaluated and information including at least one criterion for generating one or more dynamic SPTs;
an evaluation module, configured to evaluate said plurality of preset SPT according to a configured order of priorities;
a generation module, configured to generate, if said at least one criterion is met, one or more dynamic SPTs based on said information, whereby said dynamic SPTs indicate respective new conditions to be evaluated.

15. The first node of claim 14, wherein said criterion defines a determination whether a condition or all conditions of one of said preset SPTs is/are met at a specific one of said order of priorities.

16. The first node of claim 14, wherein said information for generating one or more dynamic SPTs is related to/defines a setting of said new condition to be evaluated.

17. The first node of claim 16, wherein said set new condition indicates a signaling scenario.

18. The first node of claim 14, wherein
said evaluation module is further configured to use said one or more dynamic SPTs subsequently in the configured order of priorities.

19. The first node of claim 14, further comprising:
a modifying module, configured to modify at least one of said preset SPTs with said one or more dynamic SPT.

20. The first node of claim 19, wherein said modifying module is further configured to reduce a number of conditions to be evaluated for said preset SPT to a reduced number of said new conditions to be evaluated for said dynamic SPT.

21. The first node of claim 14,
wherein the evaluation module is further configured to evaluate said generated dynamic SPTs at a subsequent priority.

22. The first node of claim 14, wherein the evaluation module is further configured to condition a processing of a subsequent service signaling based on evaluating said generated new SPTs.

23. The first node of claim 14, wherein
said generation module is further configured to generate a dynamic SPT to indicate that a subsequent service signaling does not have to be sent to an application server.

24. The first node of claim 14, wherein said first node is a S-CSCF.

25. A second node for generating dynamic Service Point Triggers (SPTs) in an IP multimedia subsystem (IMS) said second node comprising:
a configuration module for configuring Initial Filter Criteria (IFC) belonging to a service profile of a user subscribed to said IMS, said IFC including a plurality of preset SPTs, respectively indicating conditions to be evaluated and information including at least one criterion for generating one or more dynamic SPTs; and
a communication module, configured to providing the configured IFC to a first node during initial registration of the user.

26. The second node of claim 25, wherein said second node is a HSS and said first node is a S-CSCF.

* * * * *